(12) United States Patent
Horvitz et al.

(10) Patent No.: US 7,603,427 B1
(45) Date of Patent: *Oct. 13, 2009

(54) SYSTEM AND METHOD FOR DEFINING, REFINING, AND PERSONALIZING COMMUNICATIONS POLICIES IN A NOTIFICATION PLATFORM

(75) Inventors: Eric J. Horvitz, Kirkland, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/299,512

(22) Filed: Dec. 12, 2005

Related U.S. Application Data

(63) Continuation of application No. 10/764,088, filed on Jan. 23, 2004, now Pat. No. 7,003,525, which is a continuation of application No. 09/896,188, filed on Jun. 29, 2001, now Pat. No. 6,745,193.

(60) Provisional application No. 60/264,233, filed on Jan. 25, 2001.

(51) Int. Cl.
*G06F 15/16* (2006.01)
(52) U.S. Cl. ...................................... 709/207
(58) Field of Classification Search .................. 709/207
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |

(Continued)

FOREIGN PATENT DOCUMENTS

WO    WO 9800787    1/1998

OTHER PUBLICATIONS

T. Joachims, Text categorization with support vector machines: learning with many relevant features, Machine Learning, European Conference on Machine Learning, Apr. 21, 1998, pp. 137-142.

(Continued)

*Primary Examiner*—Kenny S Lin
*Assistant Examiner*—Julian Chang
(74) *Attorney, Agent, or Firm*—Wolf, Greenfield & Sacks, P.C.

(57) ABSTRACT

A system and method is provided for personalizing and refining policies within a general notification platform. The system includes a profile definition and selection system that receives contextual information relating to a user state. The profile definition and selection system generates and/or relays a set of control parameters based at least partially upon the contextual information, and a notification manager selectively sends a user notification and/or communication based upon the set of control parameters. Methods are provided for tuning the notification platform. This may include defining one or more context profiles, assigning values to parameters employed in one or more context profiles, determining a current user context, determining which of the one or more user profiles is consistent with the current user context, and utilizing the parameter value associated with the one or more context profiles consistent with the current user context to adjust the notification system.

20 Claims, 9 Drawing Sheets

U.S. PATENT DOCUMENTS

| | | | |
|---|---|---|---|
| 5,812,865 | A | 9/1998 | Theimer et al. |
| 6,029,195 | A | 2/2000 | Herz |
| 6,466,232 | B1 * | 10/2002 | Newell et al. ............... 715/700 |
| 6,510,424 | B1 | 1/2003 | Ford et al. |
| 6,513,026 | B1 | 1/2003 | Horvitz et al. |
| 6,513,046 | B1 | 1/2003 | Abbott, III et al. |
| 6,549,915 | B2 | 4/2003 | Abbott, III et al. |
| 6,735,506 | B2 | 5/2004 | Breed et al. |
| 6,745,193 | B1 | 6/2004 | Horvitz et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

36

K1 WHEN
K2 WHAT
K3 HOW
K4 WHERE
K5 MYSTATE

• • •

KN OTHER

Fig. 2

SYSTEM AND METHOD FOR DEFINING, REFINING, AND PERSONALIZING COMMUNICATIONS POLICIES IN A NOTIFICATION PLATFORM

CROSS-REFERENCE TO RELATED APPLICATIONS

This application is a continuation of U.S. patent application Ser. No. 10/764,088, filed Jan. 23, 2004, and entitled, "SYSTEM AND METHOD FOR DEFINING, REFINING, AND PERSONALIZING COMMUNICATIONS POLICIES IN A NOTIFICATION PLATFORM', which is a continuation of U.S. patent application Ser. No. 09/896,188 filed Jun. 29, 2001, entitled, "SYSTEM AND METHOD FOR DEFINING, REFINING, AND PERSONALIZING COMMUNICATION POLICIES IN A NOTIFICATION PLATFORM", now U.S. Pat. No. 6,745,193, issued on Jun. 1, 2004, which is an application claiming benefit under 35 U.S.C. 119(e) of U.S. Provisional Patent Application Ser. No. 60/264,233, filed Jan. 25, 2001, and entitled, "SYSTEM AND METHOD FOR REFINING AND PERSONALIZING COMMUNICATIONS POLICIES IN A NOTIFICATION PLATFORM." The entireties of the aforementioned applications are incorporated herein by reference.

TECHNICAL FIELD

The present invention relates generally to computer systems, and more particularly to a system and method to facilitate configuration and tuning of a plurality of parameters within a notification system, wherein the parameters are employed to personalize notification capabilities of the notification system.

BACKGROUND OF THE INVENTION

Advanced technology computer and communication systems have transformed many important aspects of human and computer interactions. This is apparent when considering how technology has forever changed electronic communications such as message transmission and retrieval. In the not too distant past, voice answering machines provided one particular way for a person to electronically capture a message and forward it to another. With technology advancements such as wireless and Internet systems however, electronic messaging systems have become much more sophisticated. These systems may include e-mail, voice mail, pager and cell phone technologies, for example, wherein almost an infinite supply of information may be sent and retrieved in a concurrent manner. Due to the content and volume of information available, and the ever increasing number of modalities for communicating such information, other systems have been developed to manage, direct and control message exchanges between parties and/or systems.

In some cases, methods from decision science and artificial intelligence, as well as other techniques have been employed to manage and direct electronic information transfers such as when and how to notify/alert a message recipient. As a general example, this may include considerations regarding the message recipient's location, what type of device (e.g., cell phone, pager, e-mail) the recipient has access to and when a particular message is transmitted. These and other considerations can enable intelligent systems to prioritize a plurality of messages directed at a particular message recipient, direct messages to a particular location and/or communication modality associated with the recipient, as well as consider whether the value of information contained within a message exceeds the cost of disrupting the recipient presently or in the future. For example, one particular message recipient may desire to receive emergency messages immediately at any time of the day, important business messages during working hours, and not receive some messages at all such as "Spam" e-mail or other unwanted solicitations. As can be expected, desires of message recipients regarding message notification and priorities can differ greatly from one recipient to another.

In order to provide these and other notification capabilities, intelligent systems generally consider and operate upon a large number of decision-making variables concerning multiple aspects of the message recipient's circumstances/desires when managing and directing message traffic to a particular recipient. These variables enable the intelligent system to determine and make decisions regarding a particular recipient's notification desires and distinguish the notification requirements from one recipient to another. In other words, each recipient has different priorities, desires and needs that influence decision-making processes and notifications flowing from the intelligent system. Consequently, in order to satisfy a variety of notification requirements applying to a plurality of different circumstances and recipients, many decision-making variables are provided to tailor notification requirements according to a particular user's needs.

Often, along with the large number of variables that influence these systems, there is a complex and/or competing relationship between the decision-making variables, however. For example, one variable or combination of variables may subtly or overtly influence decisions relating to other variables or combinations thereof. Since the number of variables involved in the decision-making process can be extensive and/or interrelated, it may be challenging for a user to personalize the decision-making process to meet specific requirements relating to that user's circumstances and desires. Thus, there is a need for a system and/or methodology to facilitate personalization and refinement capabilities of a notification system.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method to facilitate refining and personalizing communication policies in a notification system. The notification system operates on a plurality of user profile variables that define the context or current state, of a user. Depending on the context, a user is notified of impending communications defined by the context and one or more policies within the notification system to control the urgency, cost of notification, and/or importance of sending the communication (e.g., e-mail, pager) to the user, for example. Decision-making policies employed within the notification system generally need to be refined and personalized according to a set of nominal settings that may be initially defined by users and/or system designers. Such personalization capabilities enhance the value of these systems. The present invention enables users to easily manipulate, control, and thereby personalize the decision-making policies of the notification system.

In accordance with one particular aspect of the present invention, an efficient and ergonomic system is provided to enable the user to rapidly adjust parameter thresholds for initially setting user profile variables. Default settings may be provided to facilitate the initial settings and/or one or more personality profiles may be provided and selected by the user to enable the user to utilize predetermined settings consistent with a particular type of user (e.g., busy office worker, traveling worker, home worker). Alternatively, surveys may be provided to the user to determine the initial settings. As the user becomes accustomed to the amount and/or frequency of notifications, a tuning system is provided to modify and adjust particular contexts and/or subsets of the user profile variables to facilitate personalization and refinement of the notification system.

One or more context profiles that specify a particular set of user profile variables may be defined that are associated with a general tuning parameter (e.g., boost value), wherein the tuning value is employed to adjust or "tune" existing notification settings whether more or less notifications associated with the one or more context profiles are generated by the notification system. As will be described in more detail below, tuning values from one or more context profiles may be combined via a transformation to provide a singular "boost" or adjustment that controls the urgency, cost, and importance of notifications from the notification system to the user. In this manner, user's can easily adjust or personalize a system in a relative manner without having to understand complex or competing interrelationships between profiles to satisfy specific/personalized notification requirements. A user interface is provided to facilitate defining and adjusting the user profile variables and the context profiles. The interface can provide feedback indicating the effects (e.g., number of messages delivered in a time period based on previous history) of the user settings on the notification system and thus, how the settings may ultimately impact the user.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 2 is a diagram illustrating a user profile in accordance with an aspect of the present invention.

DETAILED DESCRIPTION OF THE INVENTION

Decision-making policies employed by a notification system generally need to be refined and personalized around a set of default settings, that may be set by users, administrators at an organization, and/or by system designers. Such personalization capabilities enhance the value of such systems. The present invention provides a system and methods that enable users to easily control and thereby personalize decision-making policies of a notification system. The invention enables a user to control policies by manipulating key parameters via a set of user-controlled sliders or other easy to use controls, for example, that refine the policies along different dimensions of context. This includes enabling users to establish a set of different context profiles for different periods of time, information sources, user locations, user focus of attention and/or other measures of context, such as the type of notification alerting, for example. Furthermore, users may manipulate policies along distinct and/or combinational contextual dimensions, wherein the combined influence of the changes seamlessly occur within the notification system. Users may also consider multiple dimensions together if desired, and employ mechanisms for handling dimensions that are not explicitly specified in this process. The present invention further includes defining time-based and calendar-based profiles, providing a multiple-slider-based user interface, and providing feedback for reflecting back to users estimates of possible adjustment outcomes in terms of expected number of alerts across different categories and settings.

It is noted that other types of notification policies can also be utilized in accordance with the present invention. As an example, users can employ, refine, and view sets of logical IF-THEN rules that define policies, and related controls for policies, including thresholds, message-chunking, and preferred devices, some of which may include terms that may be context sensitive. For example, rules can be employed of the form of: If I am engaged in conversation then route telephone calls to my voice mail automatically, unless the calls are from people in my critical associates category; If I am very busy working on my computer, route instant messages and e-mail to a notification journal, and display them to me when I am not busy; If I am away from my desk and in an important meeting, then route messages to my cell phone only if they have an urgency score greater than a threshold (e.g., 90, 75); If I am away from my desk and in a normal meeting, then route messages that have an urgency score greater than 75 to my cell phone. As can be appreciated, a plurality of other such rules can be similarly employed.

Figure 1:
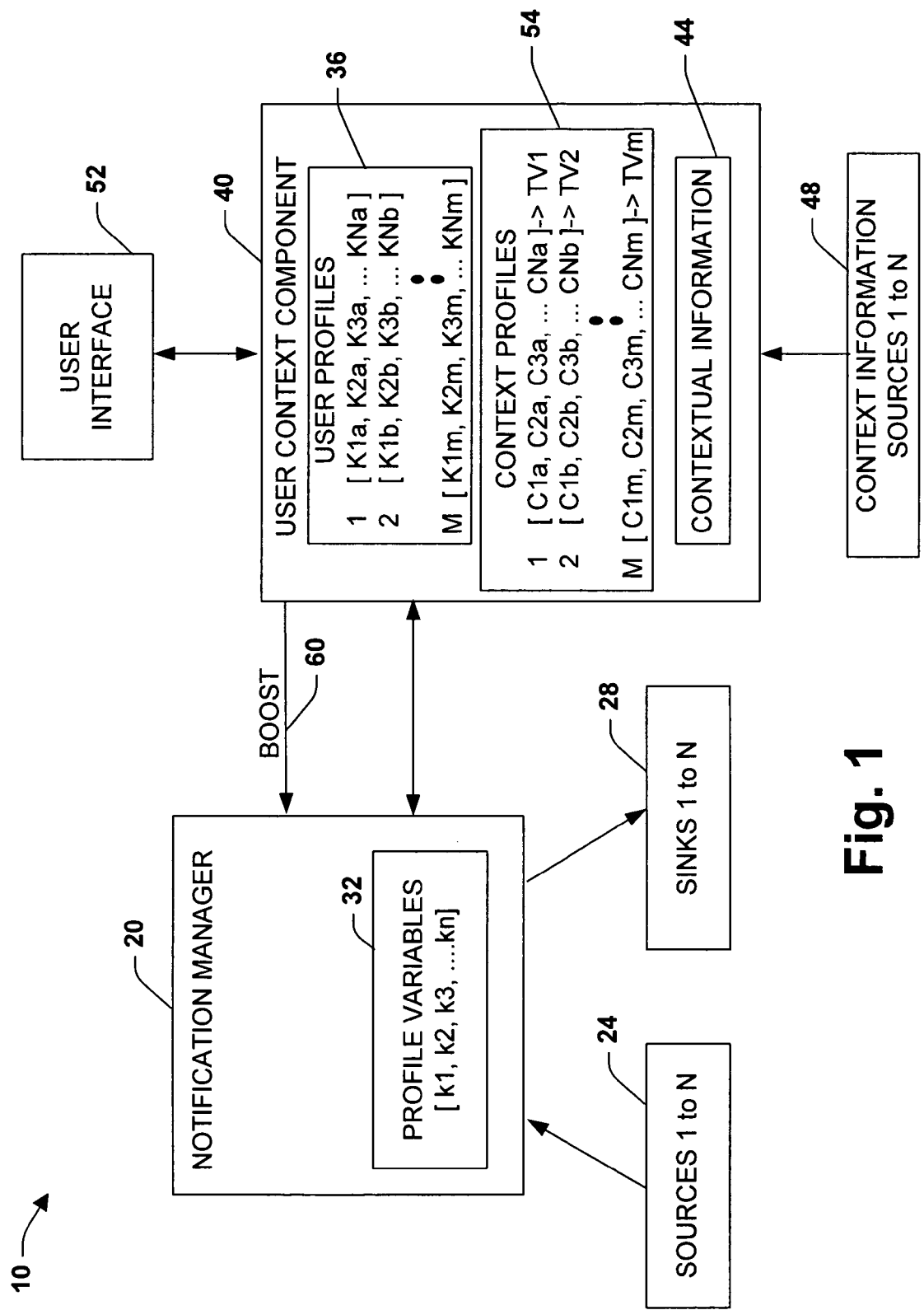
FIG. 1 is a schematic block diagram illustrating a notification system to personalize and refine communication policies in accordance with an aspect of the present invention.

Referring initially to FIG. 1, a notification system 10 illustrates personalization and refinement of notification policies in accordance with an aspect of the present invention. The notification system 10 includes a notification manager 20 for controlling the flow of notifications from a plurality of sources 24 and directing the notifications to one or more sinks 28. Notifications are directed from the sources 24 to the sinks 28 based upon policies that control the decision-making processes within the notification manager 20. The policies within the notification manager 20 are influenced by a plurality of profile variables 32, (depicted as $k_1$ through $k_n$, n being an integer), that are continually updated to reflect the current state and preferences of a user relating to being notified of message events originating from the sources 24 and communicated via the sinks 28 to the user.

In accordance with the present invention, users may specify one or more user profiles 36, (depicted as profiles 1 though M, M being an integer), each profile having one or more profile settings, (depicted as $K_1$ through $K_N$, N being an integer), that define particular notification specifications according to a context which is described in more detail below. A user context component 40 that provides profile definition and selection determines contextual information 44 associated with the user from a plurality of contextual information sources 50. Depending on the current context of the user, as indicated in the contextual information 44, the user context component 40 determines which of the user profiles 36 is consistent with the current contextual information 44 and selects 1 of M user profiles 36 (e.g., update selection variable indicating selection). Based upon the selection of a particular profile 1 through M within the user profile 36, the notification manager 20 updates the profile variables 32 with the selected profile settings $K_1$ through $K_N$ associated with the selection. It is noted, that if a current context as determined by the user context component 40 does not match any of the user profiles 36, a default and/or background profile may be selected and provided to the notification manager 20.

A user interface, 52 enables users to specify and adjust one or more of the (M) profile sets and related settings 1 through K in the user profiles 36. Users may also specify particular aspects or subsets of the user profiles 36 in which to "tune" or adjust characteristics and performance of the notification manager 20. In this manner, users can personalize and refine the performance of the notification system 10 according to particular user-specific desires. Tuning aspects may be specified in a context profile 56, (depicted as having 1 through M contexts, each context specifying 1 through N context settings $C_1$ through $C_N$). Each of the context profiles 54 may have a corresponding adjustment or tuning value (depicted as $TV_1$ through $TV_m$) assigned via the user interface 52. For any context, as determined by the user context component 40, the present invention combines parameters associated with the current user context as defined by the context profiles 54 into a singular scalar referred to as a "notification boost" depicted at reference numeral 60, wherein positive boosts increase transmission of alerts defined by the context linked to particular alerts.

The boost value 60 is employed to adjust specific parameters in the notification system 10. For example, in decision-theoretic platform that is described in more detail below, the boost may be utilized to manipulate parameters used in a decision-theoretic analysis such as relating to the importance, urgency, and cost of a notification. The boost 60 can also be utilized to manipulate any single parameter within the notification system 10, and, in the most general case, can be employed to boost any scalar metric utilized in any notification system. As will be described in more detail below, the user interface 52 can provide one or more of several metrics and displays that give the user feedback about the results of the boost 60, including one or more estimates of the number of alerts of various categories and in various contexts that the user will receive. Thus, users may define time and context-based profiles that become active at different times, calendar settings, and/or combinations of multiple dimensions that control one or more parameters (e.g., a multiple-parameter profile describing different sets of boosts).

According to an alternative aspect of the present invention, the user interface 52 can include an adaptive component that can automatically tune parameters by collecting feedback about notification behavior during a training phase, or whenever feedback is provided. This can include feedback such as, "I am busy now, that was not worth it in this context," "I'd like to be getting more e-mail," "I am being bothered too much with the help facility," along with substantially any feedback associated with the system 10. The feedback can be logged and utilized to automatically set parameters described below, with feedback and a history for tracking, reporting, and summarization of changes for users.

The following description provides a more detailed discussion relating to particular aspects of the notification system 10. Specifically, the following discussion relates to the interactivity and operation of the notification manager 20, sources 24, sinks 28, user context component 40, and the contextual information sources 48. It is noted that the sources 24 may also be referred to as event publishers, while the sinks 28 may also be referred to as event subscribers. There can be any number of sinks 24 and sources 28. In general, the notification manager 20 conveys notifications, which are also referred to as events or alerts, from the sources 24 to the sinks 28, based upon information stored in the user context component 40.

The user context component 40 stores information regarding variables and parameters of a user that influence notification decision making. For example, the parameters may include contextual information 44, such as the user's typical locations and attentional focus or activities per the time of day and the day of the week, and additional parameters conditioned on such parameters, such as the devices users tend to have in different locations. Such parameters may also be functions of observations made autonomously via one or more sensors. For example, profiles may be selected or modified based on information about a user's location as might be provided by a global positioning system (GPS) subsystem, on information about the type of device being employed and/or the pattern of usage of the device, the last time a device of a particular type was accessed by the user, for example. Furthermore, automated inference may also be employed, to dynamically infer parameters such as location and attention. The profile parameter settings may be stored in the user profile 36 that can be edited by the user via the user interface 52. Beyond relying on sets of predefined profiles or dynamic inference, the notification system 10 can also enable users to specify in real-time his or her state, such as the user not being available except for important notifications for the next x hours, or until a given time.

The parameters can also include default notification preference parameters regarding a user's preference as to being disturbed by notifications of different kinds in different settings, which can be used as the basis from which to make notification decisions by the notification manager 20, and to the basis upon which a particular user can make changes. The parameters may include default parameters as to how the user wishes to be notified in different situations, such as by cell phone, by pager, etc. The parameters can include such assessments as the costs of disruption associated with being alerted by different modes in different settings. That is, the parameters can include contextual parameters indicating the likelihoods that the user is in different locations, the likelihoods that different devices are available, and the likelihoods of his or her attentional status at a given time, as well as notification parameters indicating how the user desires to be notified at a given time.

The information stored by the user context component 40 (UCC) according to one aspect of the present invention may be inclusive of the contextual information 44 determined by the component 40. The contextual information 44 is determined by the UCC 40 by discerning/inferring the user's location and attentional status based on the one or more contextual information sources 48, as is described in more detail below. The UCC 40, for example, may be able to determine with precision the actual location of the user via a global positioning system (GPS) that is a part of a user's car, cell phone, or other device. The UCC 40 may also utilize a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and/or other considerations. For example, the type of day can include weekdays, weekends, and holidays.

Each of the sources 24 (depicted as 1 to N, N being an integer) generates notifications intended for the user. For example, the sources 24 may include communications and/or alerts, such as Internet and network-based communications, local desktop computer-based communications and alerts, and telephony communications, as well as software services, such as information offered by an intelligent help facility, background queries for information that may be of interest to users, and alerts associated with the engagement of agents that attempt to provide scheduling services, for example. A notification source is defined generally herein as that which generates notifications and alerts, intended to inform a user, or a proxy for the user, about information, services, or a system or world event. For example, e-mail may be prioritized, wherein a host application program generating the notification examines the priority corresponding to the likely importance or urgency of the e-mail to the user and the context in making decisions about alerts. The e-mail alert may also be sent without regard to the relative importance to the user, as is commonly done in a variety of desktop email clients that generate a tone or other message when new email arrives. Desktop-centric notifications can include an automated dialog with the goal of alerting a user to a potentially valuable service that he or she may wish to execute (e.g., scheduling an appointment from the text of an e-mail message), information that the user may desire to review, or errors and other alerts generated by a desktop computer. Internet-related services can include notifications including information that the user has subscribed to, such as headlines of current news every so often, stock quotes, etc.

Notification sources 24 can themselves be push-type or pull-type sources. Push-type sources are those that automatically generate and send information without a corresponding request, such as headline news and other Internet-related services that send information automatically once subscribed to. Pull-type sources are those that send information in response to a request. Still other notification sources include the following:

- e-mail desktop applications such as calendar systems (e.g., that may remind the user of an upcoming meeting);
- computer systems (e.g., that may alert the user with messages that information about alerts about system activity or problems);
- Internet-related services that provide information about one or more states about an organization or the world (e.g., financial and news services);
- changes in documents or numbers of certain kinds of documents in one or more shared folders;
- availability of new documents in response to standing or persistent queries for information; and,
- information about people and their presence, including their location and their change in location, their proximity (e.g., let me know when I am traveling if another employee of Microsoft is within 10 miles of me"), or their availability or ability to communicate over different types of communication channels (e.g., let me know when Steve is available for a conversation and is near a high-speed link that can support full video teleconferencing").

Each of the notification sinks 28, (depicted as 1 to N, N being an integer) provides the notifications to the user. For example, such notification sinks 28 can include computers, such as desktop and/or laptop computers, handheld computers, cell phones, landline phones, pagers, automotive-based computers, and/or other devices. A notification sink 28 may refer to that which subscribes, via an event subscription service, to events or notifications.

The notification manager 20 accesses the information stored by the UCC 40, and determines which of the notifications it receives from the sources 24 to convey to which of the sinks 28 based on this information. Furthermore, the notification manager 20 is able to determine how the notification is to be conveyed, depending on which of the sinks 28 it has selected to send the information to. For example, it may determine that the notification should be summarized before being provided to the sinks 28.

The present invention is not limited to how the notification manager 20 makes its decisions as to which of the notifications to convey to which of the notification sinks, and in what manner the notifications are conveyed. For example, a decision-theoretic analysis can be made, wherein the notification manager 40 can be designed to infer important uncertainties about variables including a user's location, attention, device availability, and amount of time until the user will access the information if there were no alert. The notification manager 40 can then make notification decisions about whether to alert a user to a notification, and if so, the nature of the summarization and the best device or devices to employ for relaying the notification. In general, the notification manager 20 determines the net expected value of a notification. In doing so, it can consider the following:

- the fidelity and transmission reliability of each available notification sink;
- the attentional cost of disturbing the user;
- the novelty of the information to the user;
- the time until the user will review the information on his or her own;
- the potentially context-sensitive value of the information; and,
- the increasing and/or decreasing value over time of the information contained within the notification.

The inferences made about uncertainties thus may be generated as expected likelihoods of values such as the cost of disruption to the user with the use of a particular mode of a particular device given some attentional state of the user or other consideration. The notification manager 20 makes decisions as to one or more of the following:

- what the user is currently attending to and doing (based on, for example, contextual information 44);
- where the user currently is;
- how important the information is;
- what is the cost of deferring the notification;
- how distracting would a notification be;
- what is the likelihood of getting through to the user; and,
- what is the fidelity loss associated with the use of a specific mode of a given notification sink.

Thus, the notification manager 20 performs an analysis, such as a decision-theoretic analysis, of pending and active notifications, evaluates context-dependent variables provided by information sinks and sources, and infers key uncertainties, such as the time until a user is likely to review provided information and the user's location and current attentional state.

As used herein, inference refers generally to the process of reasoning about or inferring states of the system, environment, or user from a set of observations as captured via events and/or data. Inference can be utilized to identify a specific context or action, or can be employed to generate a probability distribution over states. The inference can be probabilistic—that is, the computation of a probability distribution over states of interest based on a consideration of data and events. Inference can also refer to techniques used for composing higher-level events from a set of events and/or data. Such inference results in the construction of new events or actions from a set of observed events and/or stored event data, whether or not the events are correlated in close temporal proximity, and whether the events and data come from one or several event and data sources.

The notification manager 20 accesses information stored in a user profile 36 by the UCC 40 in lieu of or to support a personalized decision-theoretic analysis. For example, the user profile 36 may indicate that at a given time, the user prefers to be notified via a pager, and only if the notification has a predetermined importance level. Such information can be utilized as a baseline from which to start a decision-theoretic analysis, or can be the only manner by which the notification manager 20 determines how and whether to notify the user. The user context module 40 can then actively determine or infer key aspects of the context of the user, such as the user's current or future location and attentional state. Furthermore, the actual states of context can be accessed directly from the sources 24 via the notification manager 20, or can be inferred from a variety of such observations through inferential methods such as Bayesian reasoning as known within the art.

The context information sources 48, (depicted as 1 to N, N being an integer) provide information to the UCC 40 regarding the user's attentional state and location, from which the module 40 can make a determination as to the user's current context (that is, the user's current attentional state and location). Furthermore, the present invention is not limited to a particular number or type of context sources 48, nor the type of information inferred or accessed by the UCC 40. However, the context sources 48 may include multiple desktop information and events, such as mouse information, keyboard information, application information (e.g., which application is currently receiving the focus of the user), ambient sound and utterance information, text information in the windows on the desktop, etc. An event, also referred to as a notification or alert, generally includes information about an observation about one or more states of the world. Such states can include the status of system components, the activity of a user, and/or a measurement about the environment. Furthermore, events can be generated by an active polling of a measuring device or source of events, by the receipt of information that is sent on a change, or per a constant or varying event heartbeat.

Other types of context information sources 48 may include personal-information manager (PIM) information of the user, which can provide scheduling information regarding the schedule of the user. The current time of day, as well as the user's location—for example, determined by a global positioning system (GPS), or a user's use of a cell phone, PDA, or a laptop that can be locationally determined—are also types of context sources 48. Furthermore, real-time mobile device usage is a type of context source 48. For example, a mobile device such as a cell phone may be able to determine if it is currently being utilized by the user, as well as its orientation and tilt (indicating information regarding its usage as well), and acceleration (indicating information as to whether the user is moving or not).

Referring now to FIG. 2, the user profile 36 depicted in FIG. 1 is illustrated in accordance with one particular aspect of the present invention. The user creates one or more profiles relating to different context specifications within the user profile 36 by specifying zero or more parameters/settings in the range of 0 to 100, for example. This can be achieved via a slider associated with the user interface 52, and is described in more detail below. It is to be appreciated that other parameter ranges may be selected (e.g., −150 to +150). A parameter of 50, for example, may be defined as neutral, wherein a parameter setting from 0 to 49 results in fewer notification alerts defined by the context under consideration. A parameter setting from 51 to 100, for example, results in more alerts. The user can specify a parameter for any assignment of user profile variables. For example, FIG. 2 illustrates some of the possible profile variables. The variables may include:

1. When—(e.g., Weekday, Weekend, Vacation—it is noted that more variables can be included to enable users to define new time periods, contexts).
2. What—A notification source, (e.g., Messenger service, E-mail, MSNBC News, Financial information, etc.).
3. How—A notification device and particular alerting modality, (e.g., Thumbnail, Full desktop display, Full desktop display with audio herald, Pager, etc.)
4. Where—The user's location, (e.g., At Desk CPU, In Office Away from CPU, Vehicle, At Home, etc.)
5. MyState—The user's attentional state, (e.g., HighFocusSolo, ConversationInOffice, Driving, Sleeping, etc.)
6. Other context variables.

A plurality of user profile settings may thus be selected via the user interface 52 that define combinations of profile variables with associated settings in the user profile 36.

Figure 3:
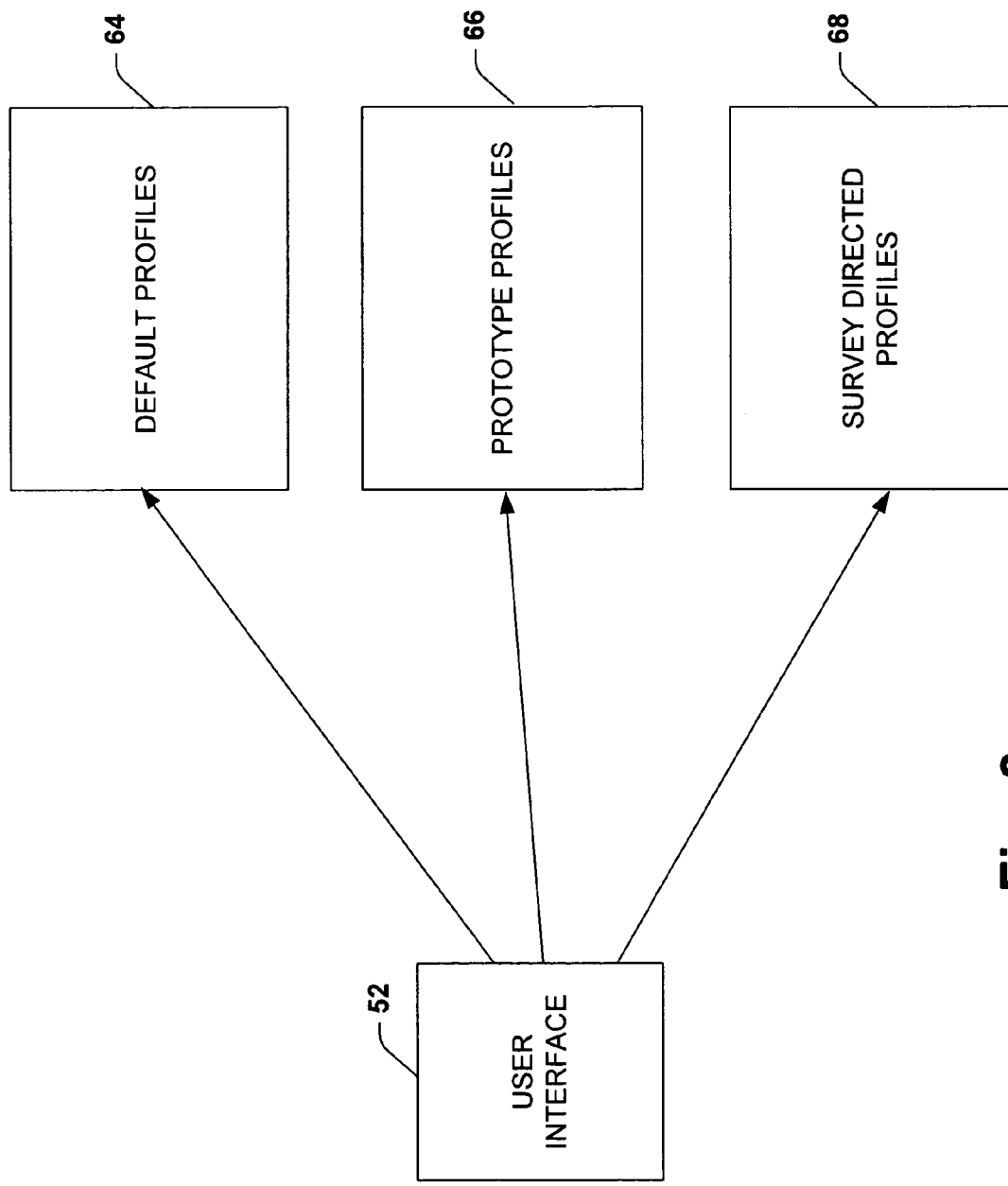
FIG. 3 is a diagram illustrating profile configurations in accordance with an aspect of the present invention.

Referring to FIG. 3, one particular aspect of the present invention illustrates how settings may be provided that facilitate configuring the user profiles 36. A base or default group of settings 64 may be provided by the present invention. For example, the default settings 64 may be set in advance based upon knowledge of typical user preferences. As described above, the default settings may be selected by the user context component 40 if current contextual information 44 does not match any of the user defined profiles. Alternatively, the present invention can enable a user to choose one or more prototypical or predetermined profiles 66 to set up default settings via the user interface 52. For example, at an initial set up time, users may be given descriptions of different "user personalities"—(e.g., busy office worker, road warrior, home CEO, etc.), wherein the user may select the closest match (e.g., from menu provided in the user interface 52) for setting up the default settings. According to another aspect of the present invention, the user may answer a set of questions, posed as a survey 68 for example, to retrieve the user's preferences and thus, utilize the answers from the survey to select a profile.

Figure 4:
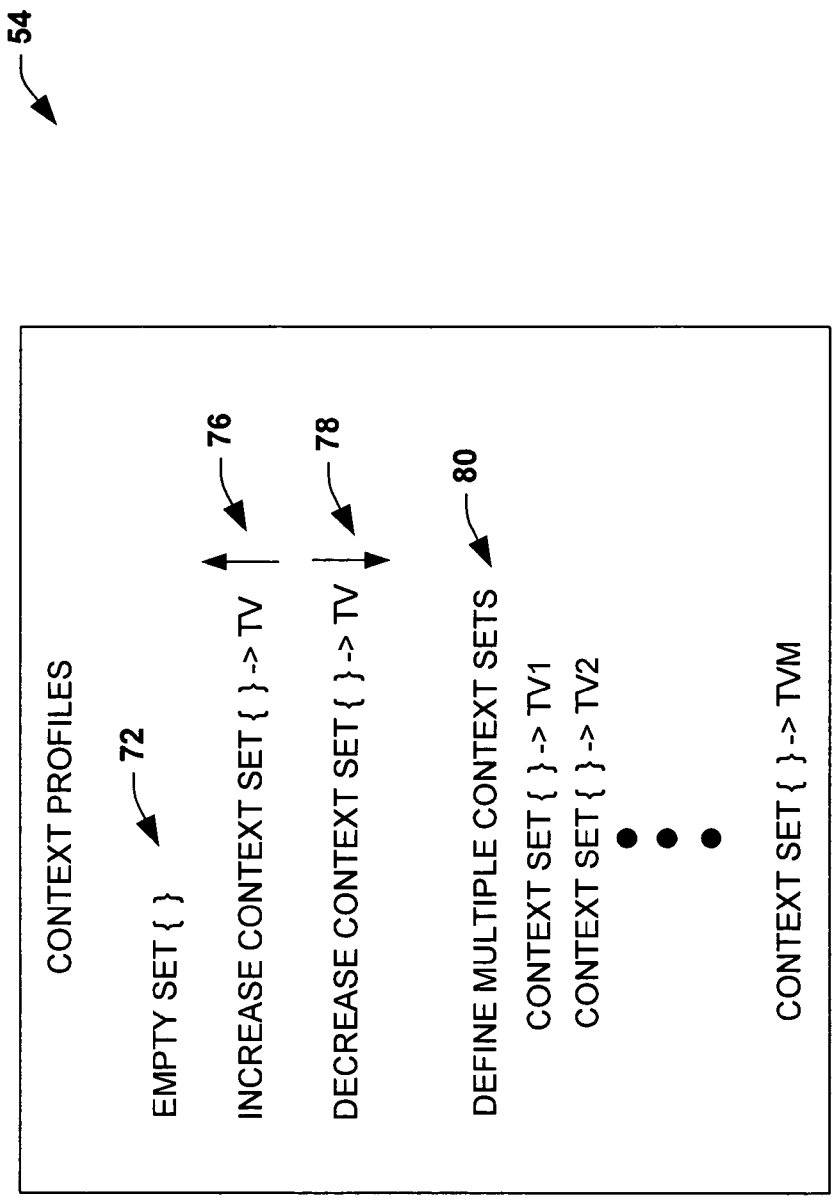
FIG. 4 is a diagram illustrating context profiles in accordance with an aspect of the present invention.

Referring now to FIG. 4, context profiles 54 and utilizations are illustrated in accordance with an aspect of the present invention. The context profiles 54 enable users to tune, customize and/or modify particular aspects of a notification system over time by specifying specific parameter sets referred to as the context profiles 54. The following examples may illustrate specific numerical values and combinations as examples of context profiles; however, it is to be appreciated that a plurality of other numerical settings and combinations may be employed in accordance with the present invention. As an example, FIG. 4 illustrates some possible context profiles 54 configurations.

One possible context profile configuration is illustrated at reference numeral 72 and illustrated as Example 1:

Example 1

{ }

An empty user profile 72 can indicate that the user is satisfied with the system's defaults, which may have been set at the factory, answering a survey, and/or choosing one or more prototypical descriptions as described above.

Another possible configuration is defined when a group or set of associated context variables are to be increased (e.g., number of alerts increased for the set) as illustrated at reference numeral 76. The following are specific examples to illustrate this concept.

Example 2

{<When=*, What=*, How=*, Where=*, MyState=*>→75}

The context profile defined in Example 2 indicates a profile with one context set that applies to all situations. This causes the user to get more notifications in all situations. The symbol (*) refers to any value of a context profile parameter to which it is assigned. Thus, the value 75, representing a tuning value in the above example, is provided to the notification manager 20 from the user context component 40 to increase "boost up" the amount of notifications provided to the user in all contexts determined in the contextual information 44.

A context profile defined at reference numeral 78 indicates another profile with one context set that applies to all situations defined by the context set. For example, context profile 78 causes the user to get fewer notifications from the notification system. The value 25 listed in Example 3 below, represents a tuning value provided to the notification manager 20 from the user context component 40 to decrease "boost down" the amount of notifications provided to the user. In Example 3, all context sets having an e-mail source apply. The following setting thus causes fewer notifications from the e-mail source.

Example 3

{<When=*, What=E-mail source, How=*, Where=*, MyState=*>→25}

Example 4 illustrated below illustrates a similar concept, wherein the user desires to receive less notifications only during Weekdays, only from the Pager, and only while the user is at home.

Example 4

{<Weekday=*, What=*, How=Pager, Where=At home, MyState=*>→10}

Reference numeral 80 illustrates how multiple context sets may be defined to tune the notification system. Example 5 below illustrates this concept wherein a user profile with two context sets is defined. Example 5 indicates the user will generally get more notifications, but in the case of notifications from E-mail sources, the user will get "fewer more". In this case, the tuning value of 25 will cancel the tuning value of 75. The present invention enables users to understand the effects of multiple context sets by interactively calculating and displaying the boost for the particular context set that is being inspected or active. This display may be provided as feedback in the user interface 52. In the case of Example 5, the user may observe that, because of the general boost parameter of 75, in the context where E-mail source is the source, moving a control input slider or tuning interface to 25 (illustrated in more detail below) results in a neutral boost, that is, neither more nor fewer E-mail alerts in relation to the tuning value of 25.

Example 5

{<When=*, What=*, How=*, Where=*, MyState=*>+75,

<When=*, What=E-mail source, How=*, Where=*, MyState=*>+25}

Figure 5:
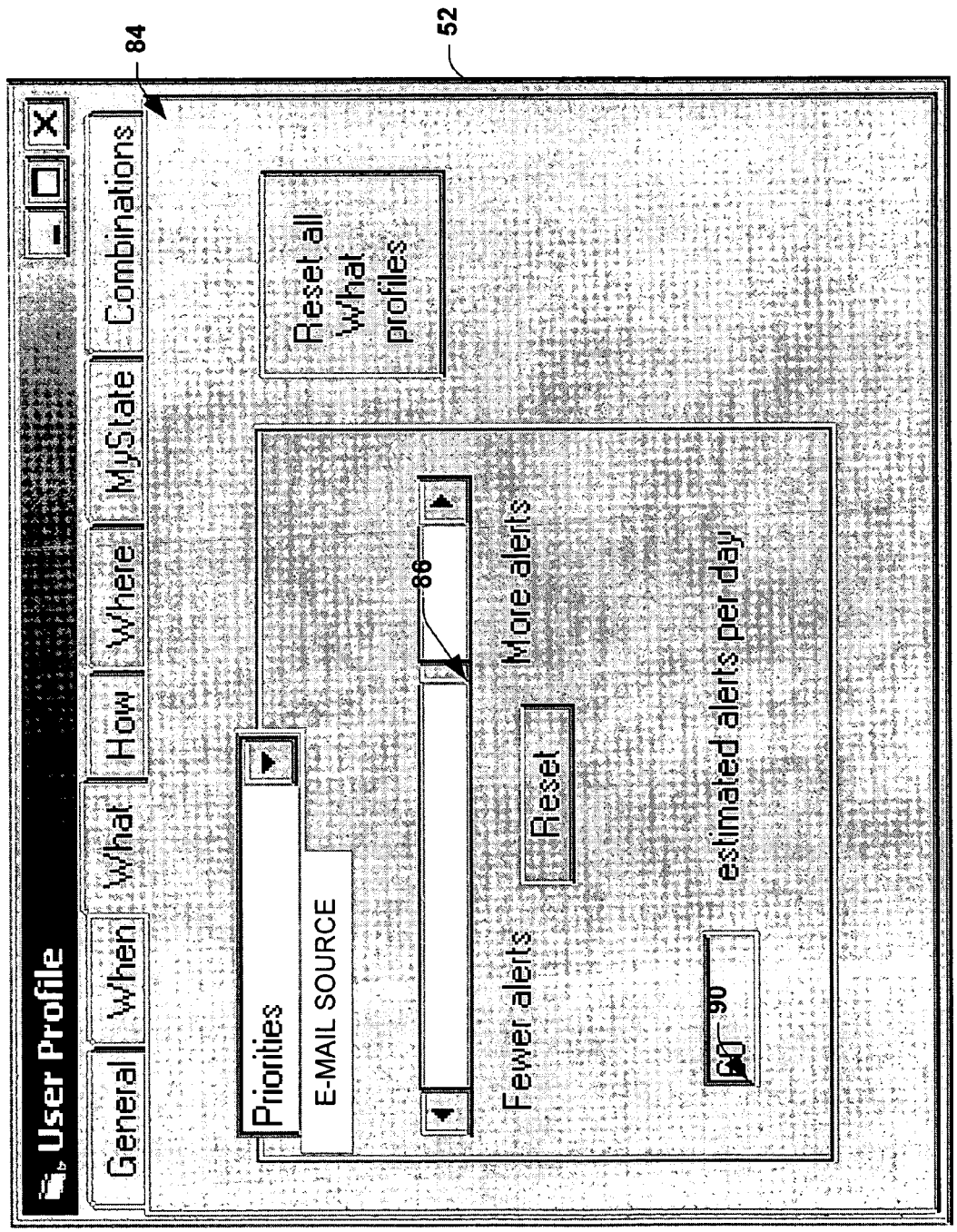
FIG. 5 is a diagram illustrating an exemplary user interface in accordance with an aspect of the present invention.

Turning now to FIG. 5, an exemplary user interface is illustrated in accordance with the present invention. Users can specify user and context profiles in terms of an overall boost for alerts in general as described above in relation to FIG. 4. However, users can also access and adjust, first, by considering independent variables that define particular variables, and in the most detailed specifications, indicate particular specific combinations relating to context. As an example, one or more tabs 84 may be provided to enable selection and modification of variables independently and/or in combination. A slider 86 and/or other type of graphical adjustment is provided to enable users to tune variables independently (e.g., mouse click on slider to adjust value) and/or tune context profile sets. The present invention enables users to receive a sense for how settings impact notifications by employing a feedback display 90. This may be achieved by relaying to users an "effective" score associated with different contexts being inspected as parameters are manipulated by users via the slider 84, for example. Other indications may also be provided to users, wherein the amount of alerts that can be expected in different contexts is displayed as variables are manipulated.

One aspect for generating user feedback 90 is to track alerting behaviors for alerts received that relate to different types and contexts over a period of time (e.g., a recent period of time, previous week) for values of parameters near the specific settings that a user has selected and to make historic statistics available as predictions of the future when the parameters are selected during a refinement, inspection stage. As an example, users may change a single threshold value that alters how many alerts are received from an e-mail source. A log or data store then records what would have happened at each of the settings including all settings that are not currently selected. When the parameter values are selected via the user interface 52, predictions are then based on past statistics.

Figure 6:
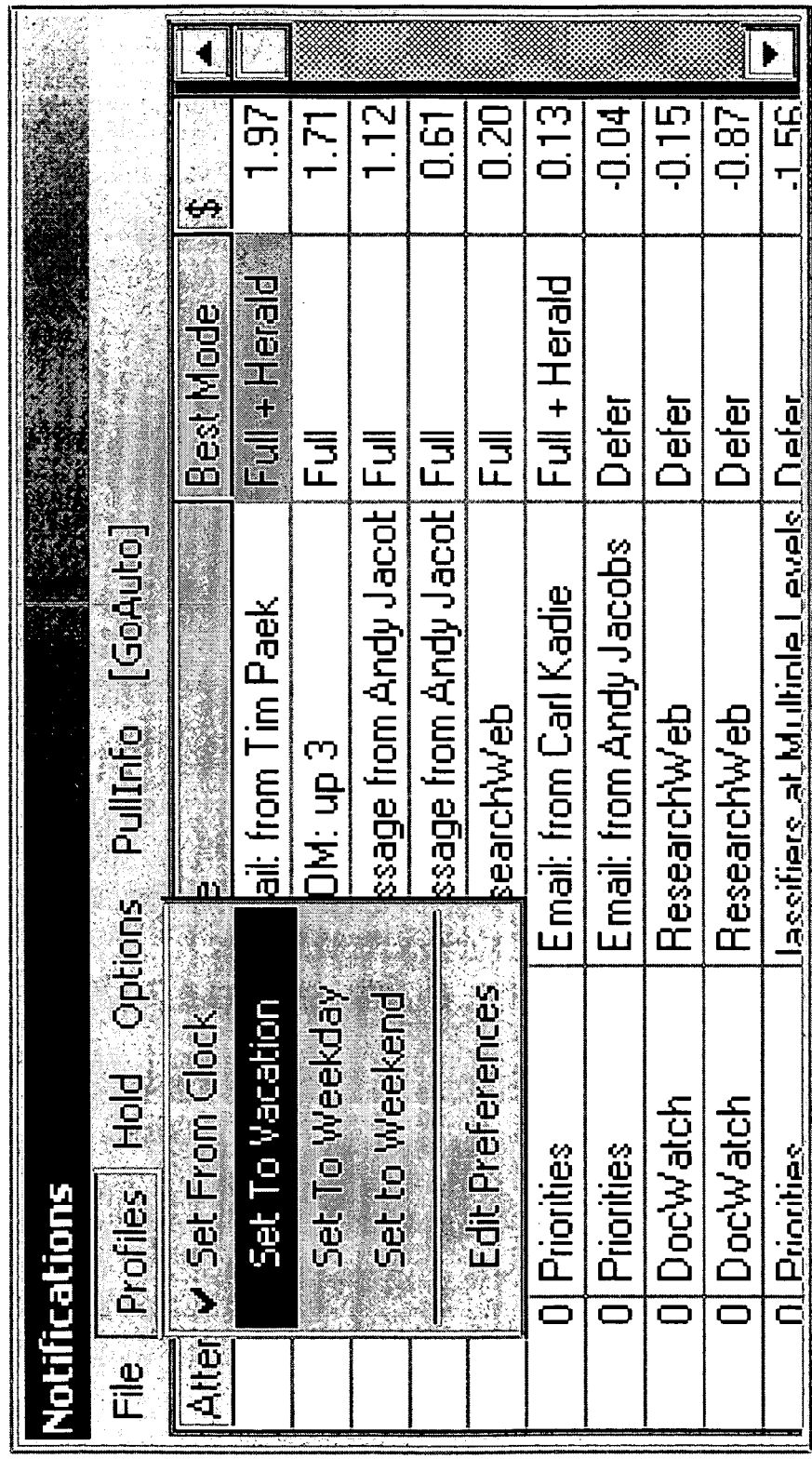
FIG. 6 is a diagram illustrating profile selections in accordance with an aspect of the present invention.

Referring briefly to FIG. 6, a user interface 94 illustrates another aspect of the present invention. According to this aspect of the invention, users may set or activate profiles according to a name and/or by attributes such as a clock, or calendar settings such as a vacation, weekday, weekend, for example.

Figure 7:
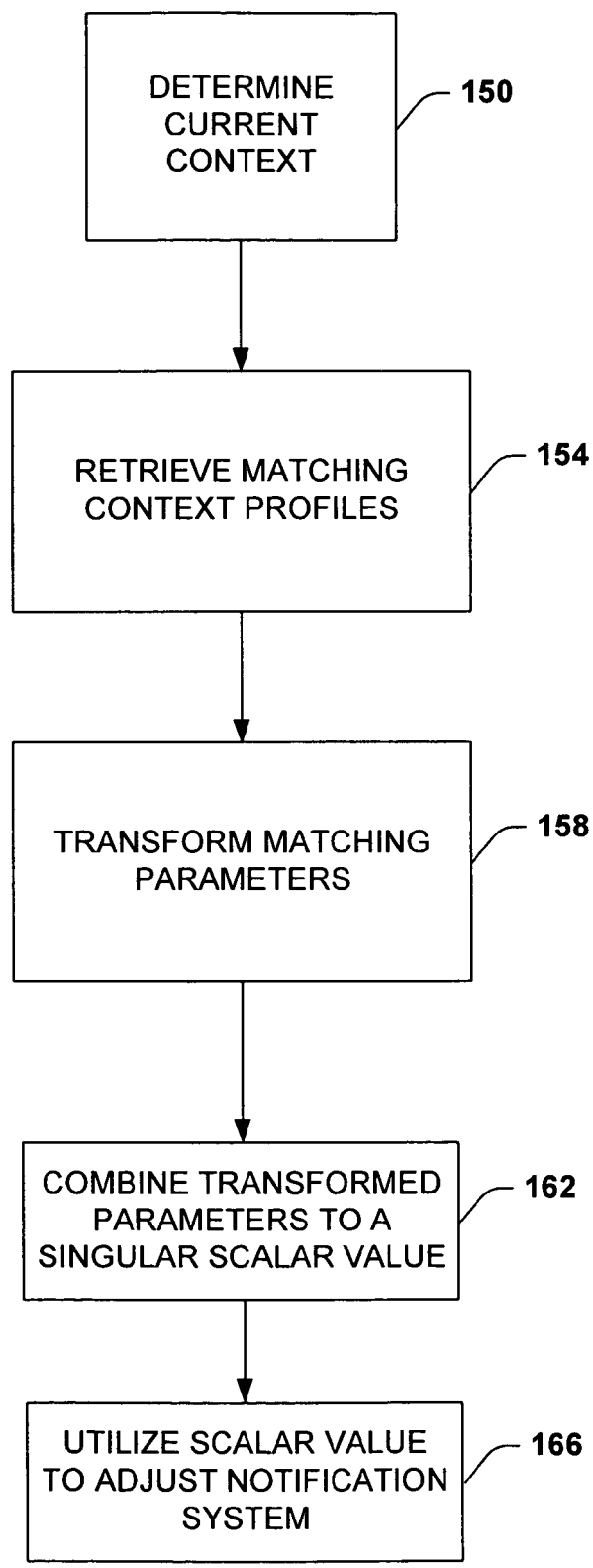
FIG. 7 is a flow chart diagram illustrating a methodology for tuning a notification system with multiple contexts in accordance with an aspect of the present invention.

FIG. 7 and the following discussion illustrate a methodology for tuning a notification system utilizing multiple context sets in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Referring to FIG. 7 and the following discussion, a methodology is provided for calculating "boost" or tuning values for any context. Example 6 is provided to describe one particular example of a multiple context set. It is to be appreciated that a plurality of other combinations, sets, and values are possible.

Example 6

{<When=*, What=*, How=*, Where=*, MyState=*>+75,

<When=*, What=E-mail sources, How=*, Where=*, MyState=*>+25,

<When=Weekday, What=MSNBC, How=*, Where=*, MyState=*>+75}

A multiple context set such as illustrated in Example 6 implies that a user will receive more notifications in most situations, but in the case of notifications from E-mail sources the user will get neither few nor more. Also, in the case of a notification from MSNBC, for example, on a weekday, the user will get "more, more" alerts. For any arbitrary context, parameters associated with each context set are combined into a single number referred to as the boost.

In the general case, the process illustrated in FIG. 7 considers a context a full assignment of profiles variables, for example, Example 7

<When=Vacation, What=Priorities, How=Pager, Where=AtHome, MyState=PersonalTime>

The boost determinations also may be applied to partial assignments such as <When=Vacation, What=Priorities>, wherein the context defaults to any value of the unspecified variables.

To determine the boost value:

At act 150, the current user context is determined. This may be achieved by inputting contextual information sources and inferring the user's current context or state. At block 154, every parameter in the user profile is compared against the current user context determined in act 150 to determine a match of the current context being considered. A parameter matches a context if it does not contradict that context. For example, if the context is:

Example 8

Current Context

<When=Vacation, What=Priorities, How=Pager, Where=AtHome, MyState=PersonalTime>

Then, these parameters match:

Example 9

<When=*, What=*, How=*, Where=*, MyState=*>+75

<When=*, What=Priorities, How=*, Where=*, MyState=*>+25 however, this context does not,

Example 10

<When=Weekday, What=MSNBC, How=*, Where=*, MyState=*>+75 since What=MSNBC contradicts What=Priorities.

Thus, at act 158, each matching boost parameter, p, associated with the matching context is transformed with the following function, for example:

$$q=1/(1/(p/100)-1)^s,$$

wherein s is a sensitivity constant, currently set to ½. This example function is simple and has the desired property of mapping the range 0 to 100 into the range 0 to infinity with 50 mapping into 1. It will be appreciated that various other functions could be used instead including those based on arctangent.

At act 162, the boost is a combined scalar value as the product of the q's. It is noted that if there are no p's and q's, then the boost is set to 1. At step 166, the boost is utilized to adjust the notification system.

It is noted that other processes or functions may be utilized to combine variables and other means may be utilized to normalize the resulting values. For example, the first consistent context can be used. Alternatively, the most specific consistent context—that is the one with the most matching literals—can be used. Also, various processes could be combined (e.g., the most specific contexts can be employed and in the event of a tie, the tied contexts can be combined as in the equation above, or, alternatively, the first consistent context among those that are most specific can be utilized).

The above described process enables the user to specify particular "cuts" on context, by explicitly citing only particular subsets of the parameters, and the process combines the specifications to compose a single boost for contexts consistent with the specification. The boost may be utilized to adjust the importance, urgency, and cost of a notification in a notification system, but can be employed to adjust any scalar quantity utilized to measure the degree to which a user might desire to review or receive alerts about particular notifications consistent with a specification.

As an example of how a boost affects notifications, the following provides three possible processes, wherein the boost is employed:

Compress/Expand Time—On a notification's decay curve, if the boost is greater than 1, compress time. For example, for a simple decay curve—characterized by an initial value, a shelf life and half life—divide the shelf life and half life by the boost, effectively compressing time. If the Boost is less than 1, the shelf life and half life are still divided by the boost, effectively expanding time.

Inflate/Deflate Notification Value—Multiply the notification's decay curve by the boost. If the Boost is greater than 1, this will inflate the value of the notification. If the boost is less than one, this will deflate the value of the boost.

Deflate/Inflate Disruption Cost—For each notification sink, divide the sink's disruption cost by the boost. If the boost is greater than 1, this will deflate the cost of disruption. If the Boost is less than 1, this will inflate the cost of disruption.

Other cases can be considered by the present invention, wherein uncertainty is involved with a context. That is, contexts can have probabilities.

Suppose the current context is known only probabilistically, for example:

Example 10

67% chance <When=Vacation, What=Priorities, How=Pager, Where=AtHome, MyState= PersonalTime>

33% chance <When=Vacation, What=Priorities, How= Pager, Where=AtHome, MyState=Sleeping>.

The boost may be determined in the above example by utilizing a weighted average to compute an "expected boost". That is, the boost may be weighted for each context by the likelihood of the context and then compute an average boost.

Figure 8:
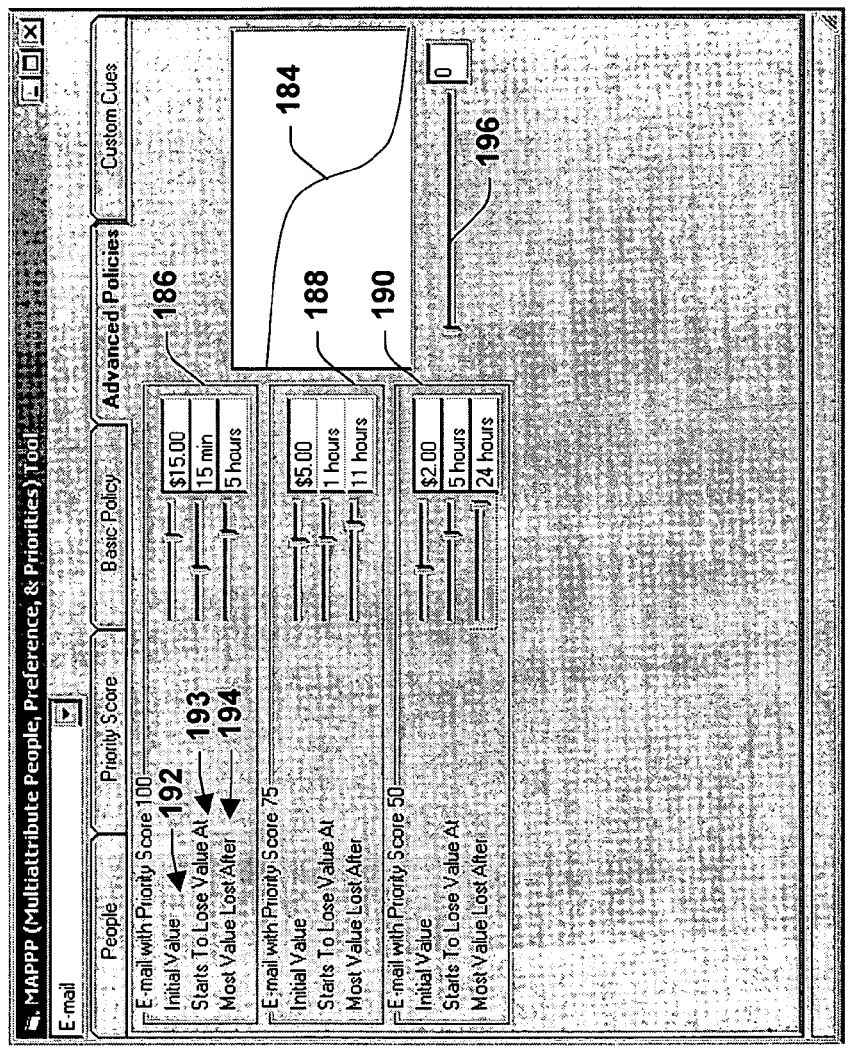
FIG. 8 is a diagram illustrating an exemplary user interface to adjust policies in accordance with an aspect of the present invention.

Referring to FIG. 8, an alternative user interface 180 is illustrated in accordance with the present invention. The user interface 180 enables users to define curves by directly assessing one or more points on a sigmoid decay curve 184 to capture notions of the dynamics of value as a function of a single priority score. The curves 184 can be related to a plurality of dynamic adjustments that can be provided to the user. For example, different decay functions can be set up depending on the priority associated with a given notification. This is illustrated at reference 186, 188, and 190. At 186 for example, an initial value adjustment 192, a start to lose value adjustment 193, and a most value lost after adjustment 194 are provided to define a curve 184 for e-mail having a priority score greater than 100. A global adjustment 196 can also be provided to adjust a set of values associated with the curve 184.

Figure 9:
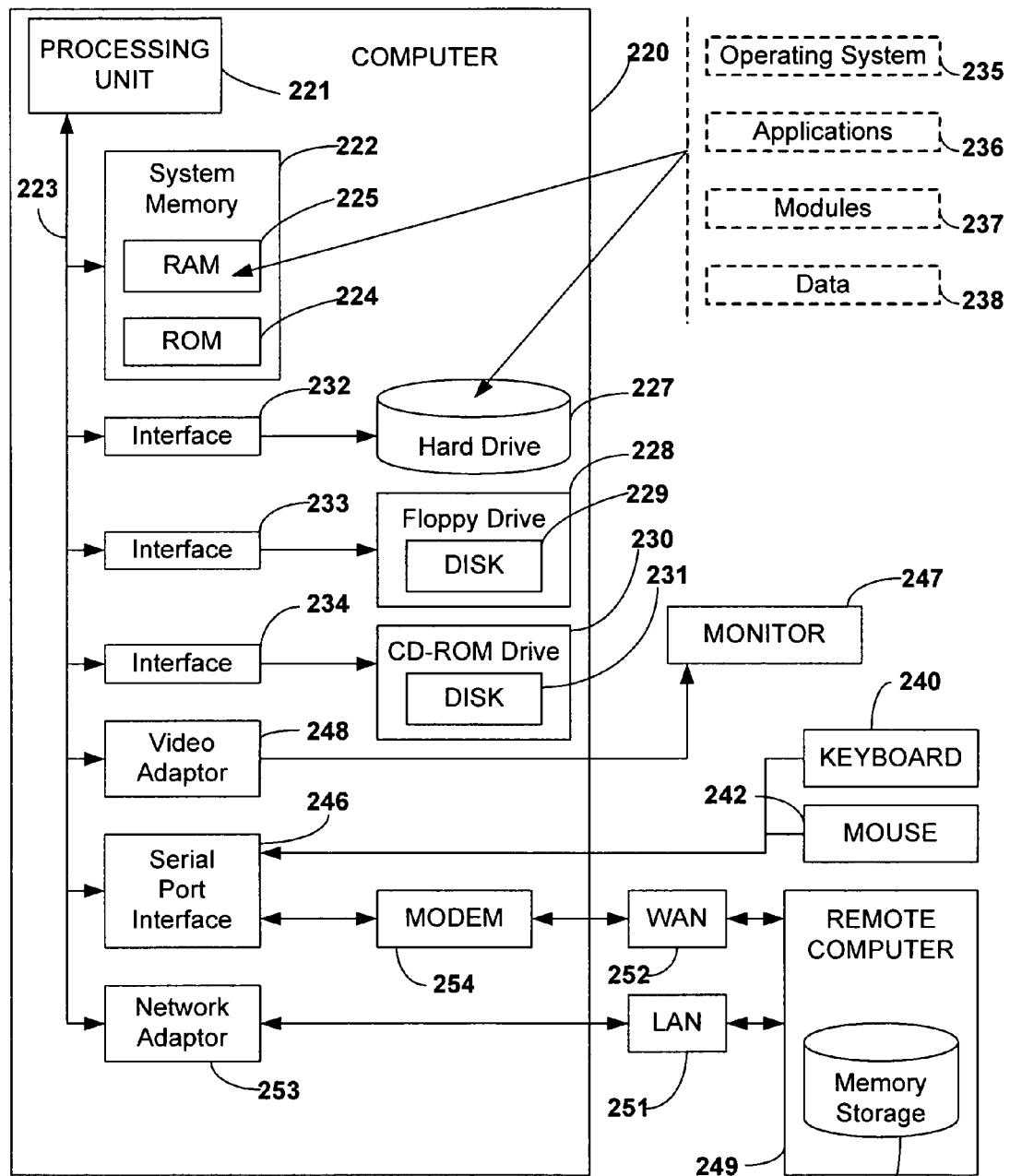
FIG. 9 is a schematic block diagram illustrating a suitable operating environment in accordance with an aspect of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

Furthermore, it is to be appreciated that the present invention can be related to a signal transmitted between at least two computer processes. For example, the signal can facilitate communications in a notification system. A data packet can communicate contextual information associated with a notification manager and a user context component. The user context component can determine the contextual information; and the signal providing at least one adjustment to the notification manager relating to the contextual information.

With reference to FIG. 9, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. It is to be appreciated that dual microprocessors and other multi-processor architectures also may be employed as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. It is noted that the operating system 235 in the illustrated computer may be substantially any suitable operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 9. The logical connections depicted in FIG. 9 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A tunable system to deliver communications, comprising;
   a processor configured to execute computer-readable instructions, the computer-readable instructions including instructions for:
   storing a policy relating to delivering a series of communications to a user, the policy including a set of parameters initialized to facilitate delivering the series of communications at a default frequency;
   tuning the policy according to a contextual profile selected from a plurality of contextual profiles, each of the plurality of contextual profiles associated with a scalar; and
   matching a state of the user to a contextual profile that does not contradict the state, wherein the tunable system is configured to throttle the default frequency as a function of the scalar associated with the matched contextual profile.

2. The tunable system of claim 1, wherein the default frequency is throttled based at least in part on a net expected value of each communication.

3. The tunable system of claim 2, wherein the net expected value is determined according to at least one of a transmission reliability of an available sink, an attentional cost of disturbing the user, a novelty of the communication to the user, a time until the user will review the communication, a context-sensitive value of the communication, or a value over time of the communication.

4. The tunable system of claim 1, wherein the default frequency is throttled based at least in part on a cost of deferring each communication.

5. The tunable system of claim 1, wherein the processor is further configured to execute instructions for inferring uncertainties about the state to determine the state.

6. The tunable system of claim 5, wherein the processor is further configured to execute instructions for inferring the uncertainties using a statistical model.

7. The tunable system of claim 1, wherein the default frequency is throttled based at least in part on feedback received from the user.

8. A method for transmitting notifications, comprising;
   employing a processor to execute computer executable instructions stored on a computer readable storage medium to implement the following acts:
   specifying a set of rules, the rules initialized to facilitate transmitting a series of notifications at an initial frequency;
   tuning the set of rules according to a contextual profile selected from a plurality of contextual profiles, each of the plurality of contextual profiles having a corresponding scalar;
   determining a current user context; and
   selectively transmitting the series of notifications to the user at a throttled frequency based at least in part on the current user context and at least one contextual profile consistent with the current user context, the throttled frequency being a function of the initial frequency and the scalar corresponding to the at least one contextual profile consistent with the current user context.

9. The method of claim 8, wherein the determining the current user context act further comprises inferring uncertainties about the current user context.

10. The method of claim 8 further comprising providing a set of predetermined profiles to the user, the specifying act comprising initializing the set of rules according to a predetermined profile selected by the user.

11. The method of claim 8 further comprising providing a survey of questions to the user, the specifying act comprising initializing the set of rules according to a set of answers to the survey provided by the user.

12. The method of claim 8 further comprising receiving an assessment from the user regarding the throttled frequency, the tuning act comprising adjusting at least one corresponding scalar according to the assessment.

13. The method of claim 8 further comprising generating an estimated frequency of notifications, the estimated frequency of notifications corresponding to a particular contextual profile having a particular corresponding scalar.

14. The method of claim 13 further comprising logging a history of notifications for the user, the generating act comprising ascertaining the estimated frequency of notifications based at least in part on the history.

15. A computer readable storage medium for personalizing a notification system, comprising:

a memory component configured to store computer-readable instructions, the computer-readable instructions including instructions for performing the following acts:

maintaining a user profile including a set of rules for transmitting a series of notifications to a user under any of a plurality of user contexts at a desired frequency;

assigning a scalar to each of a plurality of contextual profiles, each of the plurality of contextual profiles corresponding to a particular user context; and throttling the desired frequency according to a selected contextual profile, the selected contextual profile consistent with a current user context, the desired frequency adjusted as a function of the scalar corresponding to the selected contextual profile.

16. The computer readable storage medium of claim 15 further comprising instructions for inferring the current user context.

17. The computer readable storage medium of claim 15, the throttling instructions further comprising instructions for receiving an input from the user regarding performance of the desired frequency, the desired frequency further adjusted according to the input.

18. The computer readable storage medium of claim 15, the throttling instructions further comprising instructions for ascertaining the selected contextual profile when a plurality of contextual profiles are consistent with the current user context.

19. The computer readable storage medium of claim 18, the selected contextual profile ascertained according to a level of specificity corresponding to each contextual profile.

20. The computer readable storage medium of claim 18, the selected contextual profile ascertained according to a temporal order for identifying the plurality of contextual profiles consistent with the current user context.

* * * * *